(12) United States Patent
Oono et al.

(10) Patent No.: US 10,730,217 B2
(45) Date of Patent: Aug. 4, 2020

(54) INJECTION MOLDING SYSTEM AND INJECTION MOLDING METHOD

(71) Applicant: FANUC CORPORATION, Yamanashi (JP)

(72) Inventors: Hajime Oono, Yamanashi-ken (JP); Naoaki Seki, Yamanashi-ken (JP); Ryousuke Mori, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 121 days.

(21) Appl. No.: 15/946,020

(22) Filed: Apr. 5, 2018

(65) Prior Publication Data

US 2018/0290363 A1  Oct. 11, 2018

(30) Foreign Application Priority Data

Apr. 7, 2017  (JP) .................................. 2017-076420

(51) Int. Cl.
*B29C 45/76* (2006.01)
*B29C 45/42* (2006.01)

(52) U.S. Cl.
CPC .......... *B29C 45/7626* (2013.01); *B29C 45/42* (2013.01); *B29C 2045/7633* (2013.01); *B29C 2945/7625* (2013.01); *B29C 2945/76421* (2013.01); *B29C 2945/76484* (2013.01); *B29C 2945/76899* (2013.01)

(58) Field of Classification Search
None
See application file for complete search history.

(56) References Cited

U.S. PATENT DOCUMENTS

| 5,840,222 A | * | 11/1998 | Herbst | ............... B29C 37/0003 |
| | | | | 264/39 |
| 10,391,692 B2 | * | 8/2019 | Shiraishi | ............ B29C 45/1769 |
| 2003/0211188 A1 | * | 11/2003 | Kachnic | ................ B29C 45/76 |
| | | | | 425/137 |

FOREIGN PATENT DOCUMENTS

| CN | 102233579 A | 11/2011 |
| CN | 103042658 A | 4/2013 |
| CN | 106079330 A | 11/2016 |
| DE | 102015007843 A1 | 12/2015 |
| DE | 102015012764 A1 | 4/2016 |
| JP | 2310020 A | 12/1990 |
| JP | 740030 A | 2/1995 |
| JP | 7125035 A | 5/1995 |

(Continued)

OTHER PUBLICATIONS

English Abstract and Machine Translation for Chinese Publication No. 103042658 A, published Apr. 17, 2013, 10 pgs.

(Continued)

*Primary Examiner* — Monica A Huson
(74) *Attorney, Agent, or Firm* — Fredrikson & Byron, P.A.

(57) ABSTRACT

A numerical controller instructs a robot or an automated machine (external device), in relation to a main task for which a retrying operation thereof has occurred, to execute, instead of or in addition to the main task, a sorting task to distinguish an exception molded product, which was produced from a time when a determination result became successful, and until a physical quantity to be measured lies within a management range, or until a stand-by time elapses, from a normal molded product produced before the occurrence of the retrying operation.

6 Claims, 5 Drawing Sheets

(56) References Cited

FOREIGN PATENT DOCUMENTS

JP         2008105301 A      5/2008
JP          201173313 A       4/2011

OTHER PUBLICATIONS

English Abstract and Machine Translation for Chinese Publication No. 102233579 A, published Nov. 9, 2011, 20 pgs.
English Abstract and Machine Translation for Chinese Publication No. 106079330 A, published Nov. 9, 2016, 14 pgs.
English Abstract and Machine Translation for Japanese Publication No. 2008-105301 A, published May 8, 2008, 9 pgs.
English Abstract and Machine Translation for Japanese Publication No. 2011-073313 A, published Apr. 14, 2011, 12 pgs.
English Abstract and Machine Translation for Japanese Publication No. 07-040030 A, published Feb. 10, 1995, 9 pgs.
English Abstract and Machine Translation for Japanese Publication No. 07-125035 A, published May 16, 1995, 100 pgs.
English Abstract and Machine Translation for Japanese Publication No. 02-310020 A, published Dec. 25, 1990,, 7 pgs.
Untranslated Decision to Grant a Patent mailed by Japan Patent Office (JPO) for Application No. JP 2017-076420, dated Feb. 26, 2019, 3 pgs.
English Machine Translation of Decision to Grant a Patent mailed by Japan Patent Office (JPO) for Application No. JP 2017-076420, dated Feb. 26, 2019, 3 pgs.
Untranslated Notification of Reasons for Refusal mailed by Japan Patent Office (JPO) for Application No. JP 2017-076420, dated Nov. 13, 2018, 3 pgs.
English Machine Translation of Notification of Reasons for Refusal mailed by Japan Patent Office (JPO) for Application No. JP 2017-076420, dated Nov. 13, 2018, 3 pgs.
English Machine Translation for German Publication No. 102015012764 A1, published Apr. 7, 2016, 21 pgs.
English Machine Translation for German Publication No. 102015007843 A1, published Dec. 24, 2015, 19 pgs.

* cited by examiner

INJECTION MOLDING SYSTEM AND INJECTION MOLDING METHOD

CROSS-REFERENCE TO RELATED APPLICATION

This application is based upon and claims the benefit of priority from Japanese Patent Application No. 2017-076420 filed on Apr. 7, 2017, the contents of which are incorporated herein by reference.

BACKGROUND OF THE INVENTION

Field of the Invention

The present invention relates to an injection molding system configured to include an injection molding machine and a robot, as well as an injection molding method in which such a system is used.

Description of the Related Art

An injection molding system in which a robot is involved in a series of operations (hereinafter referred to as an operation cycle) of an injection molding machine has been known. For example, in Japanese Laid-Open Patent Publication No. 2011-073313, it is disclosed that a picking error occurs during an operation of holding an insert member by the robot, and thus it is necessary to bring operation of the entire injection molding system to a halt.

SUMMARY OF THE INVENTION

Even in the case that the aforementioned picking error occurs, if by retrying the operation it is possible for the injection molding system to be automatically recovered, production efficiency is not necessarily lowered. However, due to the occurrence of time in retrying the operation, a physical quantity (for example, the temperature) to be managed by the injection molding machine may temporarily deviate from its desired range. If the operation cycle is continued under this condition, since injection molding is performed in a state outside of the management range, there is a concern that the product quality of the molded product cannot be sufficiently secured.

The present invention has been devised with the aim of solving the aforementioned problems, and has the object of providing an injection molding system and an injection molding method, in which it is possible to improve production efficiency of molded products using a retrying function of retrying operations by the robot, while also contending with a phenomenon in which degradation in product quality can occur as a result of such retrying.

A first aspect of the present invention is characterized by an injection molding system comprising an injection molding machine having functions of producing a molded product for each of respective molding cycles by injection molding, and measuring a physical quantity to be managed, a robot capable of carrying out at least one main task involved in operation of the injection molding machine during the molding cycles, and a controller adapted to instruct the robot to carry out a determination in relation to success or failure of the main task executed by the robot, and to retry the main task when the determination result is a failure, wherein the controller instructs the robot or an external device, in relation to the main task for which a retrying operation thereof has occurred, to execute, instead of or in addition to the main task, a sorting task to distinguish a molded product, which was produced from a time when a determination result became successful, and until a physical quantity to be measured lies within a management range, or until a stand-by time elapses, from molded products produced before the occurrence of the retrying operation.

A second aspect of the present invention is characterized by an injection molding method in which there is used an injection molding system configured to include an injection molding machine having functions of producing a molded product for each of respective molding cycles by injection molding, and measuring a physical quantity to be managed, and a robot capable of carrying out at least one main task involved in operation of the injection molding machine during the molding cycles, the injection molding method comprising a determining step of determining success or failure of the main task executed by the robot, a retrying step of executing a retrying operation of the main task by the robot in the case that the determination result is a failure, and an executing step in which, in relation to the main task for which a retrying operation thereof has occurred, the robot or the external device executes, instead of or in addition to the main task, a sorting task to distinguish a molded product, which was produced from a time when a determination result became successful, and until a physical quantity to be measured lies within a management range, or until a stand-by time elapses, from molded products produced before the occurrence of the retrying operation.

According to the present invention, it is possible to improve production efficiency of molded products using the retrying function of retrying operations by a robot, while also contending with a phenomenon in which degradation in product quality can occur as a result of such retrying.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of an injection molding system according to the present invention in relation to an injection molding method will be presented and described with reference to the accompanying drawings.

[First Embodiment]

Initially, an injection molding system 10 according to a first embodiment will be described with reference to FIGS. 1 to 3.

<Overall Configuration of Injection Molding System 10>

Figure 1:
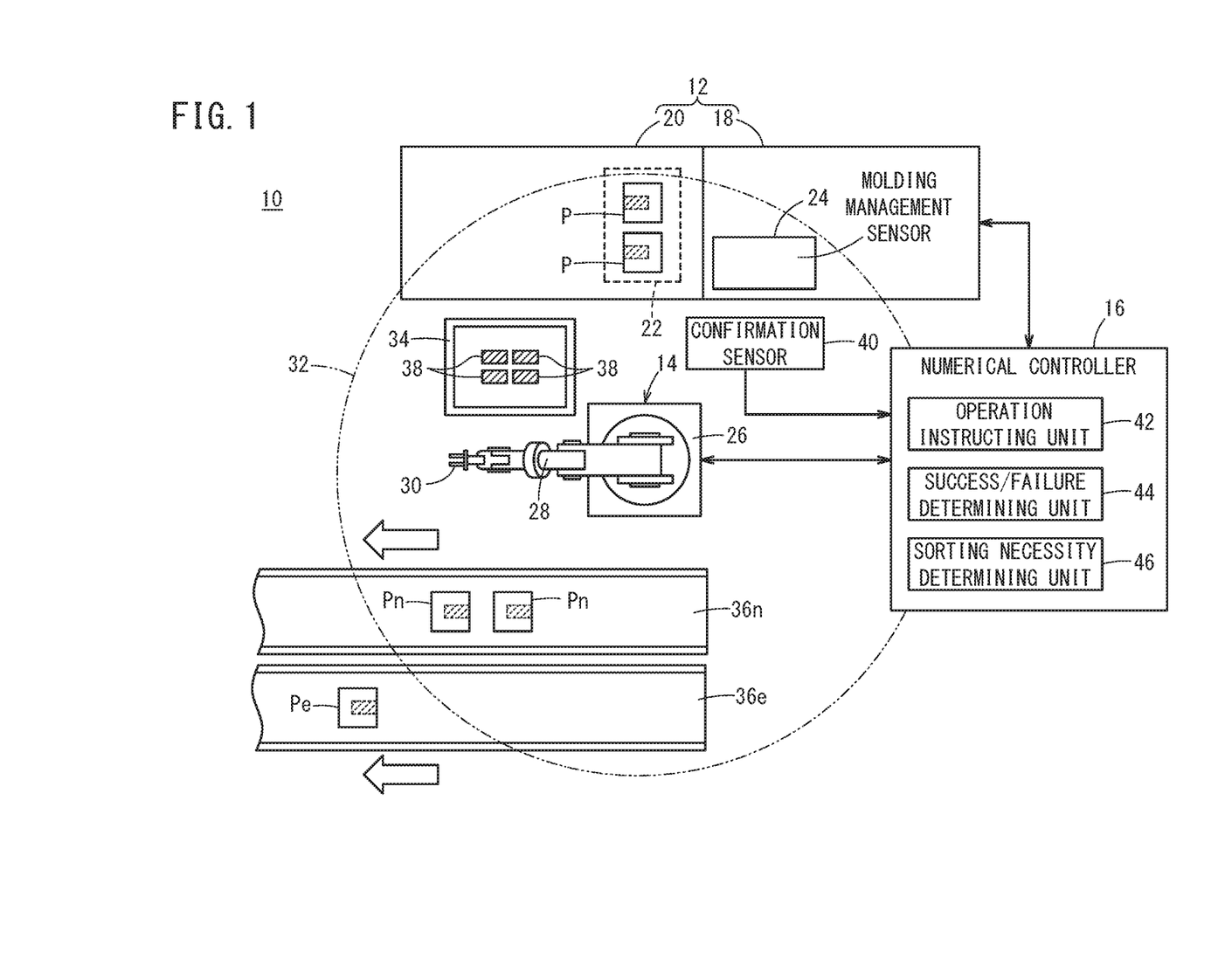
FIG. 1 is an overall configuration diagram of an injection molding system according to a first embodiment of the present invention.

FIG. 1 is an overall configuration diagram of the injection molding system 10 according to the first embodiment of the present invention. The injection molding system 10 is a system for obtaining molded products P using an injection molding technique (in the example shown in the drawing, an insert molding method), and is constituted basically from an injection molding machine 12, a robot 14, and a numerical controller 16 (controller).

The injection molding machine 12 is an apparatus which is capable of producing the molded products P in each of respective molding cycles through a series of injection molding related operations (hereinafter referred to as an operation cycle). The injection molding machine 12 is configured to include an injection unit 18 that injects a stored molding material toward a mold 22 after having heated the molding material, and a mold clamping unit 20 for clamping the molding material that has been injected into the interior of the mold 22. One or a plurality of cavities (not shown) are formed in the interior of the mold 22.

In this instance, the injection molding operation cycle includes a plurality of process steps, such as a mold clamping step, an injecting step, a pressure holding step, a weighing step, a protruding step, a cooling step, a mold opening step, a taking out step, and a releasing step, etc. In the case of the insert molding method, the operation cycle may further include an insertion step, to be described later.

Moreover, the injection molding machine 12 is further equipped with a molding management sensor 24, and includes a "measuring function" for measuring one type or a plurality of types of physical quantities to be managed, and a "management function" for controlling the one or more physical quantities so as to reside within a management range. The physical quantities are values or amounts related to product quality of the molded product P, and as specific examples thereof, there may be cited a temperature of the molding material (resin), a temperature of the mold 22, a weight of the molded product P, a metering time (plasticizing time of the resin), an injection pressure (detected by a pressure detector of the injection molding machine 12), a cushion amount (a forwardmost position of a screw operated in an injection and pressure holding step), a cavity pressure (detected by a pressure sensor installed in the mold 22), a metering torque (a load actual value of a servo motor that drives the screw), and a protruding torque (a load actual value of the servo motor that drives a protruding shaft for releasing the molded product P from the mold 22). The management range corresponds to, for example, a range obtained by imparting an allowable margin in the normal direction and the negative direction with respect to set values (target values) of the physical quantities.

The robot 14 is a vertical articulated industrial robot, and comprises an arm 28 disposed on a base 26. An end effector 30 which is capable of retaining the molded product P is mounted on the tip end part of the arm 28. As shown in the present drawing, the robot 14 is capable of accessing positions within a movable range 32 having a generally circular shape, and more specifically, is capable of accessing the mold 22, an accommodating case 34, or two rows of conveyors 36n, 36e.

The robot 14 is configured to be capable of executing one or a plurality of tasks (hereinafter referred to as main tasks) involved in operation of the injection molding machine 12 during the aforementioned molding cycles. Such "main tasks" include, for example, (1) a task of inserting an insert molding component (hereinafter referred to as an insert component 38), which is placed in the accommodating case 34, into the mold 22, and [2] a task of taking out and releasing the molded product P from the mold 22.

Incidentally, a confirmation sensor 40 for confirming the tasks of the robot 14 is provided integrally with or separately from the robot 14. The confirmation sensor 40 may be [1] a pressure sensor and a flow sensor, which are provided in a suction mechanism serving as the end effector 30 and are capable of detecting a suction state, or [2] a proximity sensor and a force sensor, which are provided in a gripping mechanism serving as the end effector 30 and are capable of detecting a gripping state. Further, the confirmation sensor 40 may be [3] a current sensor which is capable of detecting a load actual value of a motor for driving the end effector 30, or [4] a camera which is capable of capturing an image in the vicinity of the end effector 30.

The numerical controller 16 is configured to include an arithmetic processing device, a memory, and an input/output device, and is an upper-level master device that comprehensively controls the injection molding machine 12 and the robot 14. More specifically, the numerical controller 16 performs a parallel control related to the operation cycle of the injection molding machine 12 and tasks of the robot 14, in accordance with a control sequence specified by an NC (numerical control) program. By reading out and executing a program stored in the memory, the numerical controller 16 functions as an operation instructing unit 42, a success or failure determining unit 44, and a sorting necessity determining unit 46.

<Operations of Injection Molding System 10>

The injection molding system 10 according to the first embodiment is configured in the manner described above. Next, a description will be given with reference to the flowcharts of FIGS. 2 and 3 concerning operations of the injection molding system 10.

Figure 2:
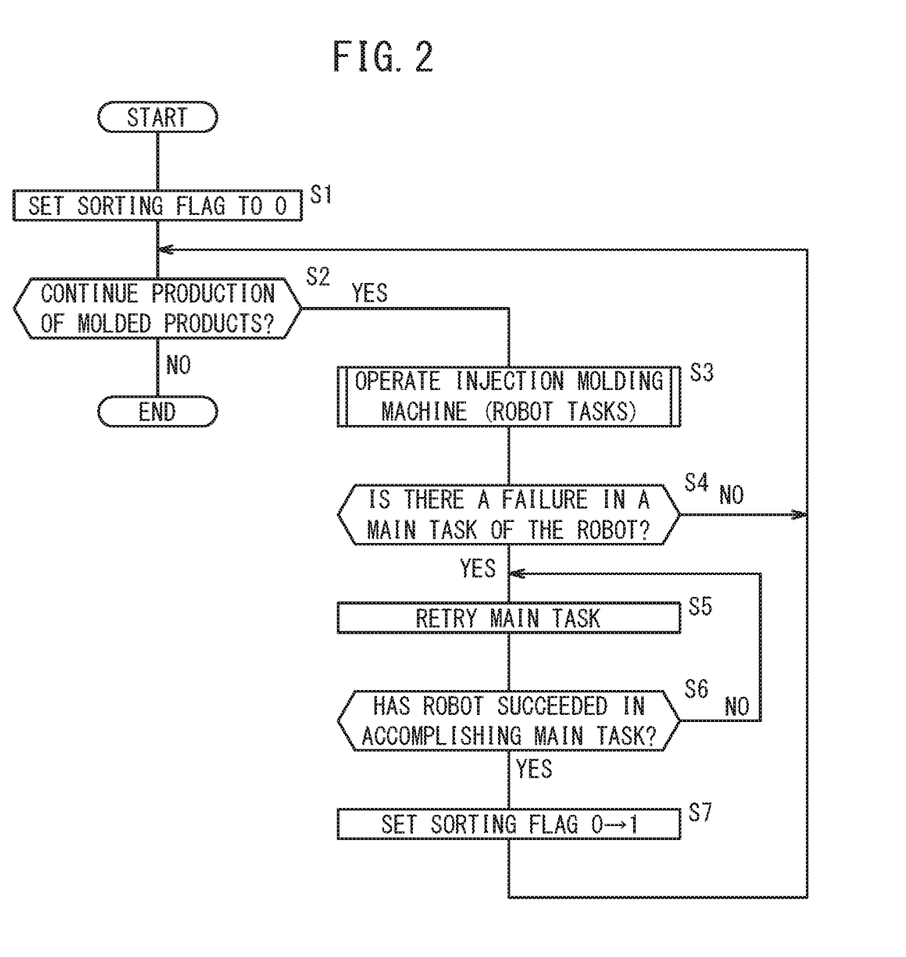
FIG. 2 is a flowchart for explaining operations of the injection molding system shown in FIG. 1.

In step S1 of FIG. 2, the sorting necessity determining unit 46 of the numerical controller 16 sets the value of a sorting flag to "0". The "sorting flag" is a binary parameter, which assumes a state value of either 0 or 1, and indicates the need for a "sorting task" to be described later.

In step S2, the numerical controller 16 determines whether or not to continue producing molded products P by injection molding. If it is determined to continue with production (step S2: YES), the process proceeds to the following step S3.

In step S3, the operation instructing unit 42 of the numerical controller 16 transmits a control signal (hereinafter referred to as an instruction signal) to instruct the operations of the injection molding machine 12 and the tasks of the robot 14. Consequently, after having received the instruction signal from the numerical controller 16, the injection molding machine 12 sequentially executes a predetermined operation cycle.

On the other hand, after having received the instruction signal from the numerical controller 16, the robot 14 executes predetermined tasks including the main tasks in a timely manner. More specifically, as the main tasks, the robot 14 executes at least one of a task of taking out and releasing the molded product P (corresponding to a "taking out step" and a "releasing step"), and a task of inserting the insert component 38 (corresponding to an "insertion step").

In step S4, the success or failure determining unit 44 of the numerical controller 16 determines whether the main task performed by the robot 14 has failed. Prior to such a determination process, the numerical controller 16 sequentially acquires a sensor signal from the confirmation sensor 40, at a timing during performance or upon completion of the main task. In addition, the success or failure determining unit 44 carries out a process of analyzing the sensor signal, and for example, in the case that the sensor signal deviates significantly from a typical value therefor at a time of success, or alternatively, in the case that an object exists (or conversely, in the case that the object does not exist) at a predetermined position within an image area, a determination is made that the main task by the robot 14 has failed.

If a determination result indicative of failure is not obtained (step S4: NO), then the process returns to step S2, and steps S2 to S4 are sequentially repeated. On the other hand, if a determination result indicative of failure is obtained (step S4: YES), then the process proceeds to step S5.

In step S5, the operation instructing unit 42 instructs that the main task be retried by sending an instruction signal to the robot 14. Consequently, after having received the instruction signal from the numerical controller 16, the robot 14 executes an operation to retry the main task that has most recently failed.

In step S6, in accordance with the same procedure implemented in step S4, the success or failure determining unit 44 determines whether or not the main task that was retried in step S5 has succeeded. In the case that a determination result indicative of failure is still obtained (step S6: NO), then the process returns to step S5, and retrying of the main task is repeated until the determination result is successful. In addition, if a determination result indicative of success is obtained (step S6: YES), then the process proceeds to step S7.

Incidentally, [1] in the case that the number of retries is large, [2] in the case that the time required for each of the tasks is long, or [3] in the case that the number of cavities of the mold 22 is large, there is a tendency for the stand-by time until the operation cycle is recovered to increase. Stated otherwise, it should be noted that the longer the stand-by time becomes, there is a greater possibility that the physical quantity will deviate from the management range.

In step S7, the sorting necessity determining unit 46 updates the value of the sorting flag from "0" to "1". Thereafter, the process returns to step S2, and henceforth, execution of steps S2 to S7 is repeated. On the other hand, in the case that production of molded articles P is not to be continued (step S2: NO), the numerical controller 16 terminates operation of the injection molding machine 12 and operation of the robot 14, respectively.

<Tasks of Robot 14 (step S3 of FIG. 2)>

Next, a description will be given in detail with reference to the flowchart of FIG. 3 and the overall configuration diagram of FIG. 1 concerning the tasks performed by the robot 14 in step S3. Moreover, it should be noted that the procedure shown in the flowchart is executed at a timing at which the robot 14 takes out and releases a molded product P.

Figure 3:
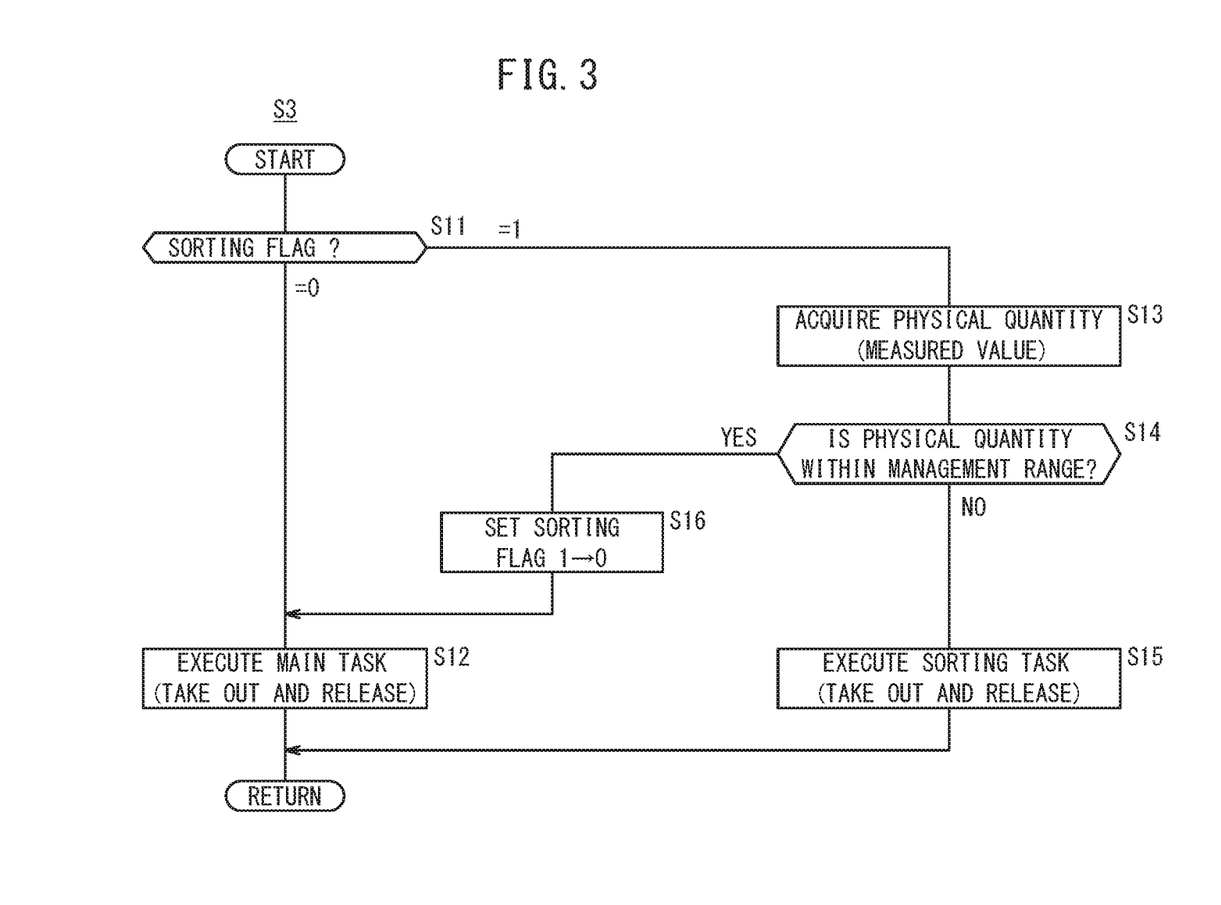
FIG. 3 is a detailed flowchart concerning operations of a robot.

In step S11 of FIG. 3, the sorting necessity determining unit 46 refers to the actual value of the sorting flag, and in the case that the value of the flag is "0 (no sorting)" (step S11: =0), the process proceeds to step S12.

In step S12, the operation instructing unit 42 instructs that a main task (in this instance, taking out and releasing) be executed by transmitting an instruction signal to the robot 14. Consequently, after having received the instruction signal from the numerical controller 16, the robot 14 carries out a task to release the molded product P that was taken out from the opened mold 22 onto the conveyor 36*n*. The molded product P which is released on the side of the conveyor 36*n* is produced under a condition in which the physical quantity to be managed lies within the management range, and hereinafter, is referred to as a normal molded product Pn in order to distinguish it.

On the other hand, returning to step S11, in the case that the value of the flag is "1 (the need for sorting exists)" (step S11: =1), the process proceeds to step S13.

In step S13, the numerical controller 16 acquires at least one type of physical quantity that was measured most recently by the molding management sensor 24 of the injection molding machine 12. Depending on the execution history of the main tasks or the retrying operations, the physical quantity may lie within the management range or may deviate from the management range.

In step S14, the sorting necessity determining unit 46 determines whether or not the physical quantity measured in step S13 lies within the management range. In the case it is determined that the physical quantity does not lie within the management range (i.e., if it falls outside of the management range) (step S14: NO), the process proceeds to step S15.

In step S15, by transmitting an instruction signal to the robot 14, the operation instructing unit 42 instructs the robot 14 to execute a different task (hereinafter referred to as a sorting task) instead of the main task that was performed in step S12. Consequently, after having received the instruction signal from the numerical controller 16, the robot 14 carries out the sorting task to distinguish the molded product P that was taken out from the opened mold 22 from the regular molded products Pn. More specifically, the robot 14 takes out the molded product P from the mold 22, and releases the molded product P onto the conveyor 36*e*. The molded product P which is released on the side of the conveyor 36*e* is produced under a condition in which the physical quantity to be managed falls outside of the management range, and hereinafter, is referred to as an exception molded product Pe in order to distinguish it.

For example, in the case that the physical quantity is temporarily deviated from the management range, in accordance with a management function of the injection molding machine 12, the physical quantity is made to gradually approach the management range accompanying an elapse of time. Then, if it is determined that the physical quantity lies within the management range (step S14: YES), the process proceeds to step S16.

In step S16, the sorting necessity determining unit 46 updates the value of the sorting flag from "1" to "0". In addition, after having transitioned to step S12, the operation instructing unit 42 instructs that the main task (taking out and releasing) be executed by transmitting an instruction signal to the robot 14.

Stated otherwise, [1] during a period until the retrying operation occurs, the robot 14 releases the produced molded product P as a "normal molded product Pn" onto the conveyor 36*n*, whereas [2] in the case that the retrying operation has occurred, the robot 14 releases the molded product P, which was produced during a period from a time when the determination result became successful and until the physical quantity to be measured lies within the management range, as an "exception molded product Pe" onto the conveyor 36*e*.

Thereafter, the exception molded product Pe on the conveyor 36*e* is inspected precisely by a machine evaluation process or visual inspection by a human. In this manner, sequentially produced molded products P are sorted into either good parts or defective parts.

<Modifications>

The sorting task of step S15 may involve a different type of operation other than releasing the exception molded product Pe at a sorting location (the conveyor 36*e*) that differs from the normal location (the conveyor 36*n*). For example, the robot 14 may execute either one of a task of subjecting the exception molded product Pe to a marking process (specifically, laser marking), or a task of discarding the exception molded product Pe.

Further, in step S15, different sorting tasks may be executed depending on an amount of divergence (for example, a difference from an upper limit value or a lower limit value) between the measured physical quantity and the management range. Since the quality of the molded product P tends to change in accordance with the amount of divergence, a fine and meticulous sorting task is enabled. For example, the robot 14 may release the exception molded product Pe onto the conveyor 36e in the case that the divergence amount is relatively small, whereas the robot 14 may discard the exception molded product Pe directly in the case that the divergence amount is relatively large.

Further, in step S14, a determination is made as to whether or not the physical quantity lies within the management range, however, the determination condition is not limited to this feature. For example, in the case that a predetermined stand-by time has elapsed from the time when the determination result indicative of success was obtained (step S14: YES), it may be considered that the physical quantity already lies within the management range, and thus the process may proceed to step S16.

[Second Embodiment]

Next, an injection molding system 60 according to a second embodiment will be described with reference to FIGS. 4 and 5. The same reference numerals are used to indicate the same structural elements as those of the first embodiment (injection molding system 10), and descriptions concerning the configuration of such elements may be omitted in certain cases.

<Overall Configuration of Injection Molding System 60>

Figure 4:
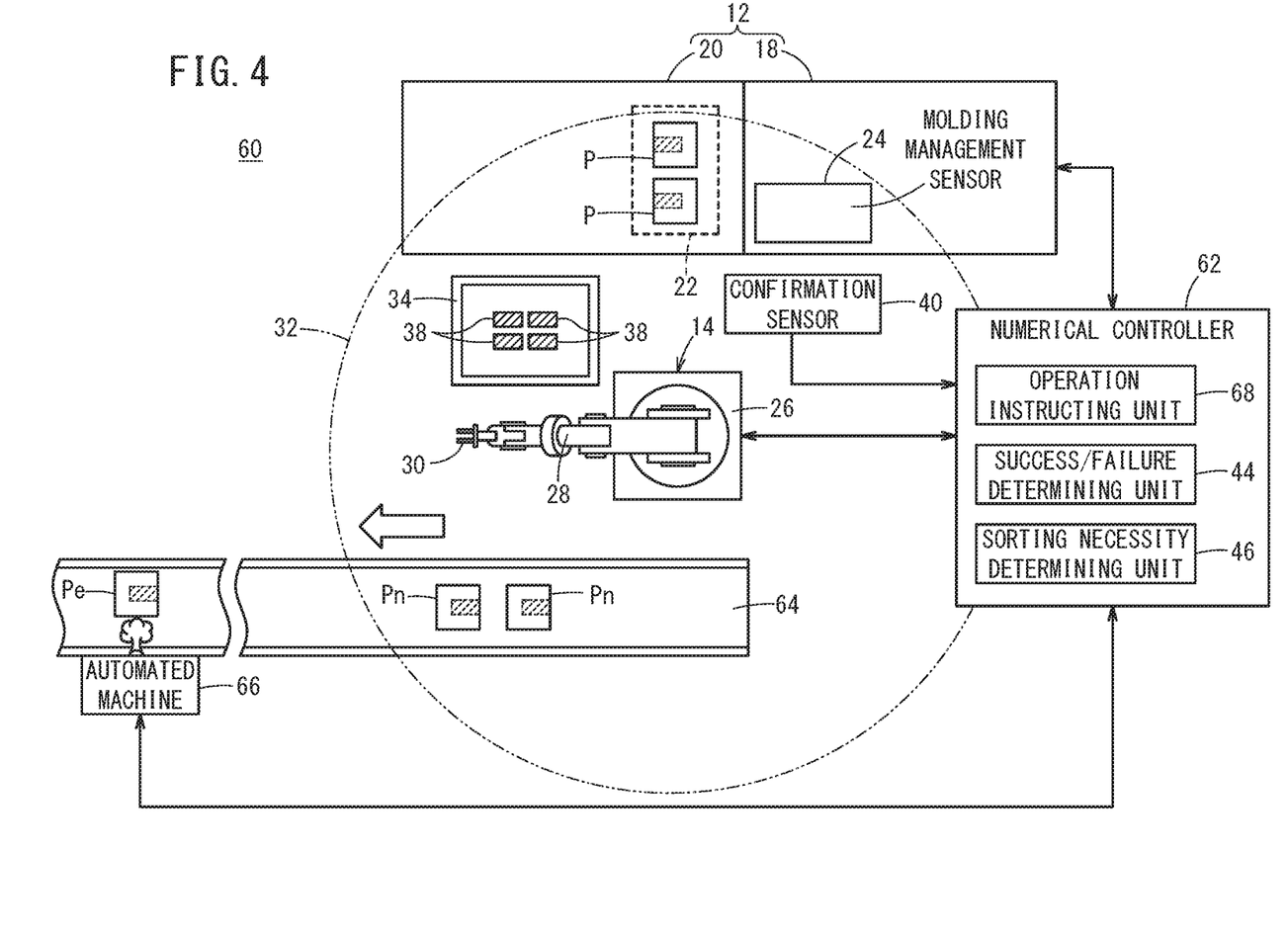
FIG. 4 is an overall configuration diagram of an injection molding system according to a second embodiment of the present invention.

FIG. 4 is an overall configuration diagram of the injection molding system 60 according to the second embodiment of the present invention. In the same manner as the first embodiment (injection molding system 10), the injection molding system 60 is constituted basically from an injection molding machine 12, a robot 14, and a numerical controller 62 (controller).

The robot 14 is capable of accessing positions within a movable range 32 having a generally circular shape, and more specifically, is capable of accessing the mold 22, the accommodating case 34, or a conveyor 64 disposed along one row. On a downstream side of the conveyor 64, an automated machine 66 is installed which is capable of communicating with the numerical controller 62. The automated machine 66, for example, may be an air blowing device that blows air to remove the molded product P from the conveyor 64, or may be a marking device that subjects the molded product P to a marking process.

The numerical controller 62 is an upper-level master device having basically the same hardware configuration as that of the first embodiment (numerical controller 16). However, the numerical controller 62 functions as an operation instructing unit 68 that differs from the first embodiment (operation instructing unit 42).

<Operations of Injection Molding System 60>

The injection molding system 60 according to the second embodiment is configured in the manner described above. With the exception of step S3, the operations of the injection molding system 60 are the same as those of the first embodiment (flowchart of FIG. 2), and therefore description of such operations will be omitted.

<Tasks of Robot 14 or Automated Machine 66 (Step S3 of FIG. 2)>

Next, a description will be given in detail with reference to the flowchart of FIG. 5 and the overall configuration diagram of FIG. 4 concerning the tasks performed by the robot 14 or the automated machine 66 in step S3. Moreover, it should be noted that the procedure shown in the flowchart is executed at a timing at which the robot 14 takes out and releases a molded product P.

Figure 5:
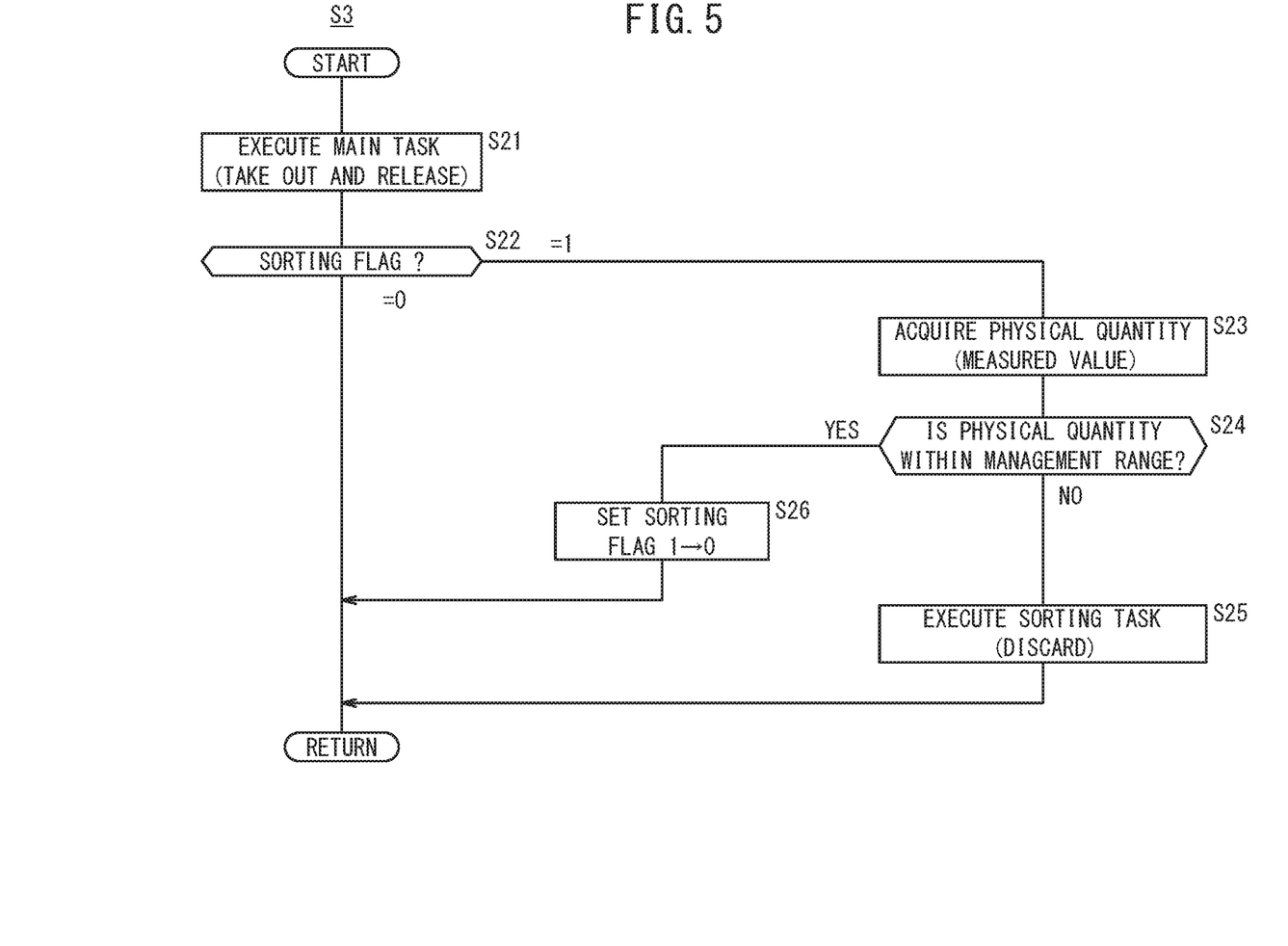
FIG. 5 is a detailed flowchart concerning operations of a robot and an automated machine.

In step S21 of FIG. 5, the operation instructing unit 68 of the numerical controller 62 instructs that a main task (in this instance, taking out and releasing) be executed by transmitting an instruction signal to the robot 14. Consequently, after having received the instruction signal from the numerical controller 62, the robot 14 carries out a task to release the molded product P that was taken out from the opened mold 22 onto the conveyor 64.

In step S22, the sorting necessity determining unit 46 of the numerical controller 62 refers to the actual value of the sorting flag, and in the case that the value of the flag is "0 (no sorting)" (step S22: =0), execution of the flowchart is brought to an end. Since the molded product P is produced under a condition in which the physical quantity to be managed lies within the management range, the molded product P passes by the automated machine 66 undisturbed while being conveyed on the conveyor 64, and is treated as a regular molded product Pn. On the other hand, in the case that the value of the flag is "1 (the need for sorting exists)" (step S22: =1), the process proceeds to step S23.

In step S23, similar to the case of the first embodiment (step S13), the numerical controller 62 acquires at least one type of physical quantity that was measured most recently by the molding management sensor 24 of the injection molding machine 12. Depending on the execution history of the main tasks or the retrying operations, the physical quantity may lie within the management range or may deviate from the management range.

In step S24, the sorting necessity determining unit 46 determines whether or not the physical quantity measured in step S23 lies within the management range. In the case it is determined that the physical quantity does not lie within the management range (i.e., if it falls outside of the management range) (step S24: NO), the process proceeds to step S25.

In step S25, by transmitting an instruction signal to the automated machine 66, the operation instructing unit 68 instructs the automated machine 66 to execute a different task (hereinafter referred to as a sorting task) from the main task performed in step S21. Consequently, after having received the instruction signal from the numerical controller 62, the automated machine 66 carries out the sorting task to distinguish the molded product P on the conveyor 64 from the regular molded products Pn. More specifically, the automated machine 66 performs an operation of blowing air onto the molded product P and removing (i.e., discarding) the molded product P from the conveyor 64. Since it is produced under a condition in which the physical quantity to be managed falls outside of the management range, the molded product P is excluded at the position of the automated machine 66, and is treated as an exception molded product Pe (product to be discarded).

For example, in the case that the physical quantity is temporarily deviated from the management range, in accordance with a management function of the injection molding machine 12, the physical quantity is made to gradually approach the management range accompanying an elapse of time. Then, if it is determined that the physical quantity lies within the management range (step S24: YES), the process proceeds to step S26.

In step S26, the sorting necessity determining unit 46 updates the value of the sorting flag from "1" to "0", and then terminates execution of the present flowchart.

Stated otherwise, [1] during a period until the retrying operation occurs, the produced molded products P are treated as "normal molded products Pn" and the automated machine 66 is not operated, whereas [2] in the case that the retrying operation has occurred, the molded product P, which was produced during a period from a time when the determination result became successful and until the physical quantity to be measured lies within the management range, is treated as an "exception molded product Pe" and the automated machine is operated. In this manner, sequentially produced molded products P are sorted into either good parts or defective parts.

<Modifications>

The sorting task of step S25 may involve a different type of operation other than discarding the exception molded product Pe. For example, the automated machine 66 may execute a task of subjecting the exception molded product Pe to a marking process (specifically, laser marking). In this case, exception molded products Pe, which were subjected to the marking process, are sorted into either a good part or a defective part, after undergoing an evaluation process by a machine or visual inspection by a human.

[Technical Concepts Obtained from First and Second Embodiments]

Technical concepts that can be grasped from the above-described first and second embodiments and the modifications thereof will be described below.

The injection molding system (10, 60) includes [1] the injection molding machine (12) having the functions of producing the molded product (P) for each of respective molding cycles by injection molding, and measuring a physical quantity to be managed, and [2] the robot (14) which is capable of carrying out at least one main task involved in operation of the injection molding machine (12) during the molding cycles.

In addition, the injection molding system (10, 60) includes [3] the controller (numerical controller 16, 62) adapted to instruct the robot (14) to carry out a determination in relation to success or failure of the main task executed by the robot (14), and to retry the main task when the determination result is a failure, wherein [4] the controller instructs the robot (14) or an external device (the automated machine 66), in relation to the main task for which a retrying operation thereof has occurred, to execute, instead of or in addition to the main task, a sorting task to distinguish a molded product (the exception molded product Pe), which was produced from a time when a determination result became successful, and until a physical quantity to be measured lies within a management range, or until a stand-by time elapses, from molded products (the normal molded products Pn) produced before the occurrence of the retrying operation.

Further, an injection molding method in which the injection molding system (10, 60) is used includes [1] a determining step (step S4) of determining success or failure of the main task executed by the robot (14), [2] a retrying step (step S5) of executing a retrying operation of the main task by the robot (14) in the case that the determination result is a failure, and [3] an executing step (step S15, step S25) in which, in relation to the main task for which a retrying operation thereof has occurred, the robot (14) or the external device (automated machine 66) executes, instead of or in addition to the main task, a sorting task to distinguish a molded product (the exception molded product Pe), which was produced from a time when a determination result became successful, and until a physical quantity to be measured lies within a management range, or until a standby time elapses, from molded products (the normal molded products Pn) produced before the occurrence of the retrying operation.

In accordance with the configurations described above, it is possible to improve production efficiency of molded products P using the retrying function of retrying operations by the robot (14), while also contending with a phenomenon in which degradation in product quality can occur as a result of such retrying.

Further, as the sorting task, the robot (14) may execute any one of a task of releasing the distinguished molded product (referred to hereinafter as the exception molded product Pe) at a different sorting location (the conveyor 36e), a task of subjecting the exception molded product Pe to a marking process, or a task of discarding the exception molded product Pe.

Further, as the sorting task, the external device (automated machine 66) may execute a task of subjecting the exception molded product Pe to a marking process, or a task of discarding the exception molded product Pe.

Further, as the main task, the robot (14) may execute at least one of a task of taking out and releasing the molded product (P), and a task of inserting an insert component (38).

Further, the controller (16, 62) may instruct that different sorting tasks be executed depending on an amount of divergence between the measured physical quantity and the management range. Since the quality of the molded product (P) tends to change in accordance with the amount of divergence, a fine and meticulous sorting task is enabled.

Further, the injection molding machine (12) may be equipped with a function of measuring the physical quantity which relates to product quality of the molded product (P). By using a physical quantity that directly or indirectly influences the product quality of the molded product (P), a more appropriate sorting task is enabled.

Further, the injection molding machine (12) may comprise the mold (22) in which a plurality of cavities are formed. As the number of cavities becomes greater, the time required for the tasks of the robot (14) and until the main tasks are completed becomes longer. Corresponding to the time required for the tasks, the time involved in retrying becomes longer, and by such an amount, the possibility that the physical quantity may deviate from the management range becomes higher. Therefore, the effect of contending with product quality, as described above, is realized in a more remarkable manner.

[Remarks]

The present invention is not limited to the embodiments described above, and it goes without saying that the present invention can be freely modified within a range that does not depart from the essence and gist of the present invention. Alternatively, the respective configurations may be combined arbitrarily within a range in which no technical inconsistencies occur.

What is claimed is:

1. An injection molding system comprising:
   an injection molding machine having a function of producing a molded product for each of respective molding cycles by injection molding, and having a sensor that measures a physical quantity to be managed;

a robot capable of carrying out at least one main task involved in operation of the injection molding machine during the molding cycles; and a controller that comprises a processing device programmed to instruct the robot to carry out a determination in relation to success or failure of the main task executed by the robot, and to retry, when a determination result is a failure, the main task until the determination result becomes successful;

wherein the processing device is further programmed to determine that a sorting task is needed that distinguishes a molded product produced from a time when the determination result with respect to the main task that the robot has been instructed to retry became successful until the physical quantity lies within a management range, or from said time until a predetermined stand-by time elapses, from molded products produced before the occurrence of the retrying operation, wherein the processing device is further programmed to instruct the robot to execute any one of a task of releasing, at a different sorting location compared to the molded products produced before the occurrence of the retrying operation, the molded product for which it is determined that the sorting task is needed, a task of marking, or a task of discarding.

2. The injection molding system according to claim 1, wherein, as the main task, the robot executes at least one of a task of taking out and releasing the molded product, and a task of inserting an insert component.

3. The injection molding system according to claim 1, wherein the controller instructs that different sorting tasks be executed depending on an amount of divergence between the measured physical quantity and the management range.

4. The injection molding system according to claim 1, wherein the injection molding machine is equipped with a function of measuring the physical quantity which relates to product quality of the molded product.

5. The injection molding system according to claim 1, wherein the injection molding machine comprises a mold in which a plurality of cavities are formed.

6. An injection molding method in which there is used an injection molding system configured to include an injection molding machine having a function of producing a molded product for each of respective molding cycles by injection molding, and having a sensor that measures a physical quantity to be managed, and a robot capable of carrying out at least one main task involved in operation of the injection molding machine during the molding cycles, the injection molding method of each of the injection molding cycles comprising:

a determining step of determining success or failure of the main task executed by the robot;

a retrying step of executing, in the case that a determination result is a failure, a retrying operation of the main task by the robot until the determination result becomes successful; and an executing determining step in which it is determined that a sorting task is needed that distinguishes a molded product produced from a time when the determination result with respect to the main task that the robot has been instructed to retry became successful until the physical quantity lies within a management range, or from said time until a predetermined stand-by time elapses, from molded products produced before the occurrence of the retrying operation, a step of the robot executing any one of a task of releasing, at a different sorting location compared to the molded products produced before the occurrence of the retrying operation, the molded product for which it is determined that the sorting task is needed, a task of marking, or a task of discarding, wherein, during at least one of the injection molding cycles, the determining step determines failure of the main task executed by the robot.

* * * * *